US010103996B2

(12) United States Patent
Camacho et al.

(10) Patent No.: US 10,103,996 B2
(45) Date of Patent: Oct. 16, 2018

(54) DYNAMIC STATUS UPDATE SOLICITATION

(71) Applicant: General Motors LLC, Detroit, MI (US)

(72) Inventors: Esteban Camacho, Belleville, MI (US); Alexander X. Cermak, Grosse Pointe Woods, MI (US); Ryan Olejniczak, Clinton Township, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/146,268

(22) Filed: May 4, 2016

(65) Prior Publication Data
US 2017/0324667 A1    Nov. 9, 2017

(51) Int. Cl.
*H04M 3/00*    (2006.01)
*H04L 12/853*    (2013.01)
(Continued)

(52) U.S. Cl.
CPC ........ *H04L 47/2416* (2013.01); *B60R 25/209* (2013.01); *G07C 9/00103* (2013.01); *H04M 1/72527* (2013.01); *H04W 28/0221* (2013.01); *H04W 52/0212* (2013.01); *H04W 52/0219* (2013.01); *H04W 52/0245* (2013.01); *H04W 52/0277* (2013.01); *G07C 5/008* (2013.01); *H04M 1/6075* (2013.01); *Y02D 70/1222* (2018.01); *Y02D 70/1224* (2018.01); *Y02D 70/1262* (2018.01); *Y02D 70/142* (2018.01);
(Continued)

(58) Field of Classification Search
CPC ......... H04W 28/0221; H04W 52/0212; H04W 52/0219; H04W 52/0245; H04W 52/0277; G07C 5/008; G07C 9/00103; B60R 25/209; Y02D 70/1262; Y02D 70/164; Y02D 70/1222; Y02D 70/166; Y02D 70/1224; Y02D 70/142; Y02D 70/144; Y02D 70/146; Y02D 70/162
See application file for complete search history.

(56) References Cited

U.S. PATENT DOCUMENTS 8,386,157 B2 * 2/2013 Kim ...................... G01S 5/0027
340/995.13
8,868,292 B2 * 10/2014 Park ................... B60H 1/00657
701/2

(Continued)

*Primary Examiner* — Wayne H Cai
(74) *Attorney, Agent, or Firm* — David Willoughby; Reising Ethington P.C.

(57) ABSTRACT

A system and method of providing status updates to one or more mobile devices. The method includes receiving a vehicle action request from the mobile device at a central office, determining a status update frequency based upon at least one real-time characteristic, and instructing the mobile device to request status updates on the vehicle action request to the central office at the status update frequency. In an alternative method, a plurality of mobile devices may be instructed to use different status update frequencies. The system includes a server configured to receive a vehicle action request from the mobile device at a central office, determine a status update frequency based upon at least one real-time characteristic, and instruct the mobile device to request status updates on the vehicle action request to the central office at the status update frequency.

20 Claims, 2 Drawing Sheets

(51) Int. Cl.
  *B60R 25/20*    (2013.01)
  *G07C 9/00*     (2006.01)
  *H04M 1/725*    (2006.01)
  *H04W 28/02*    (2009.01)
  *H04W 52/02*    (2009.01)
  *G07C 5/00*     (2006.01)
  *H04M 1/60*     (2006.01)

(52) U.S. Cl.
  CPC .......... *Y02D 70/144* (2018.01); *Y02D 70/146* (2018.01); *Y02D 70/162* (2018.01); *Y02D 70/164* (2018.01); *Y02D 70/166* (2018.01)

(56) References Cited

U.S. PATENT DOCUMENTS

| | | | |
|---|---|---|---|
| 9,123,244 B2 * | 9/2015 | Daman | G08G 1/127 |
| 9,454,786 B1 * | 9/2016 | Srey | G06Q 40/08 |
| 9,635,699 B2 * | 4/2017 | Lau | H04W 76/027 |

* cited by examiner

Figure 1

DYNAMIC STATUS UPDATE SOLICITATION

TECHNICAL FIELD

The present invention relates to systems and methods for controlling vehicles via remote devices, and more particularly to systems and methods for executing vehicle commands via mobile communication devices such as cellular phones or smartphones, merely as examples.

BACKGROUND

Remote controls for motor vehicles include systems relying on the use of vehicle-specific parts, e.g., key fobs, to lock, unlock, or even start the engine of a motor vehicle. More recently, original equipment manufacturers (OEMs) have equipped vehicles with systems that can be accessed and/or controlled remotely via a mobile device such as a smartphone or computer. For example, some vehicles now come equipped with systems that respond to user commands transmitted from a mobile device by way of an application supported on the mobile device. Vehicle users now may access and command an increasing number of vehicle systems. Merely by way of example, users may access vehicle information such as tire pressure, fuel level, oil level, recent fuel economy via these applications. Additionally, users now may send a variety of vehicle commands by way of these applications, such as unlocking/locking the vehicle, remotely starting the engine, or activating a horn or alarm of the vehicle.

The increasing number of available vehicle commands has led to increased demands placed upon communication systems employed by the vehicle and/or manufacturer for sending and receiving vehicle commands. The intensity of activity the communication systems must support may also widely vary. Merely as one example, a large number of remote start commands typically are sent by users during extreme weather in a given region, while comparatively few are sent when ambient temperatures are less extreme. System activity may also increase on certain days of the week and/or at certain times of day, for example at the end of the business day during the work week when a relatively large number of users are accessing vehicle data as they prepare to leave their office. A variety of other factors impacts system activity, creating a wide swing in system demand. This large variance in activity forces compromises in communication system facility design, as maximizing capability to meet peak demand results in cost inefficiencies during non-peak demand conditions. While rule-based systems may improve efficiency, e.g., by increasing capacity at certain times of day/week or in response to temperature changes, the wide variety of factors impacting system activity intensity still causes system inefficiencies. Additionally, operating conditions of a mobile device being used to send a vehicle command, e.g., battery level or strength of a communication signal, may affect the user experience.

Accordingly, there is a need for an improved remote command system and method for vehicles that addresses the above shortcomings.

SUMMARY

An exemplary method of providing status checks or updates to a mobile device may include receiving a vehicle action request from the mobile device at a central office, and determining a status update frequency based upon at least one real-time characteristic. The method may further include instructing the mobile device to request status updates on the vehicle action request to the central office at the status update frequency.

Another exemplary method may be directed to providing status updates to a plurality of mobile devices, and may include receiving vehicle action requests from the plurality of mobile devices at a central office. Different status update frequencies may be determined for each of the plurality of mobile devices based upon at least one real-time characteristic associated with each mobile device, respectively. The method may further include instructing each of the mobile devices to request status updates on the vehicle action request to the central office at their assigned status update frequency.

An exemplary system is also disclosed for providing status updates to a mobile device, which includes a server configured to receive a vehicle action request from the mobile device at a central office. The server may be configured to determine a status update frequency based upon at least one real-time characteristic, and instruct the mobile device to request status updates on the vehicle action request to the central office at the status update frequency.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Exemplary illustrations are described herein of a vehicle and associated methods of providing status updates to mobile devices, e.g., which indicate a status of requests sent by the mobile devices. The disclosed exemplary approaches generally allow for providing status updates at a frequency determined from at least one real-time characteristic. In this manner, status update frequencies may be optimized according to factors impacting central office traffic. Merely as introductory examples, real-time characteristics may include a capacity of a central office for sending status updates, an ambient temperature where a vehicle is located, or a current time of day or day of the week. In other examples, real-time characteristics may be specific to the mobile device(s) communicating with the central office, such as a battery life of the device, or a signal strength of the mobile device. Additional examples are discussed below, and numerous others will be understood from the following description.

In some exemplary approaches, different status update frequencies may be used for different mobile devices. For example, mobile devices in different geographical regions may be experiencing different conditions at a given time, which may affect the user experience differently. Additionally, as noted above operating conditions of mobile devices themselves may affect the user experience, e.g., battery level or signal strength of an associated communication network. Accordingly, where a plurality of mobile devices are being affected by different real-time characteristics at a given time, a corresponding plurality of different status update frequencies may be used to respond to the different conditions affecting each mobile device.

Communications System

Figure 1:
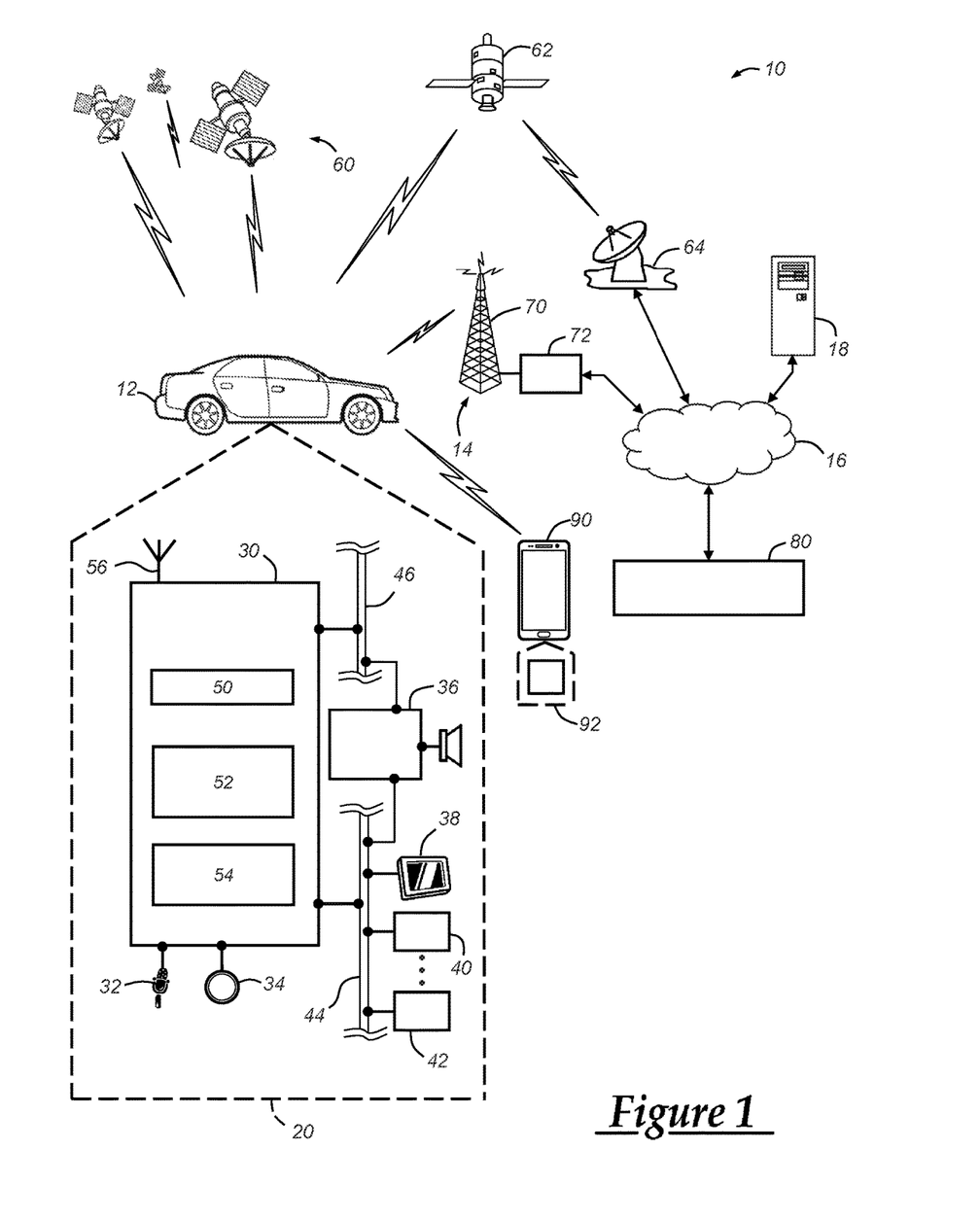
FIG. 1 is a block diagram depicting an embodiment of a communications system that is capable of utilizing the exemplary methods disclosed herein.

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 18, for other purposes, such as fleet management. Also, new or updated map data can be downloaded to the GPS module 40 from the remote facility 80 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 80. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 18 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 16. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle device, meaning that it is not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application 92 that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. Wireless device 90 is shown as a smartphone having cellular telephone capabilities. In other embodiments, device 90 may be a tablet, laptop computer, or any other suitable device. In addition, application 92 may also allow the user to connect with the remote facility 80 or call center advisors at any time.

Method—

Figure 2:
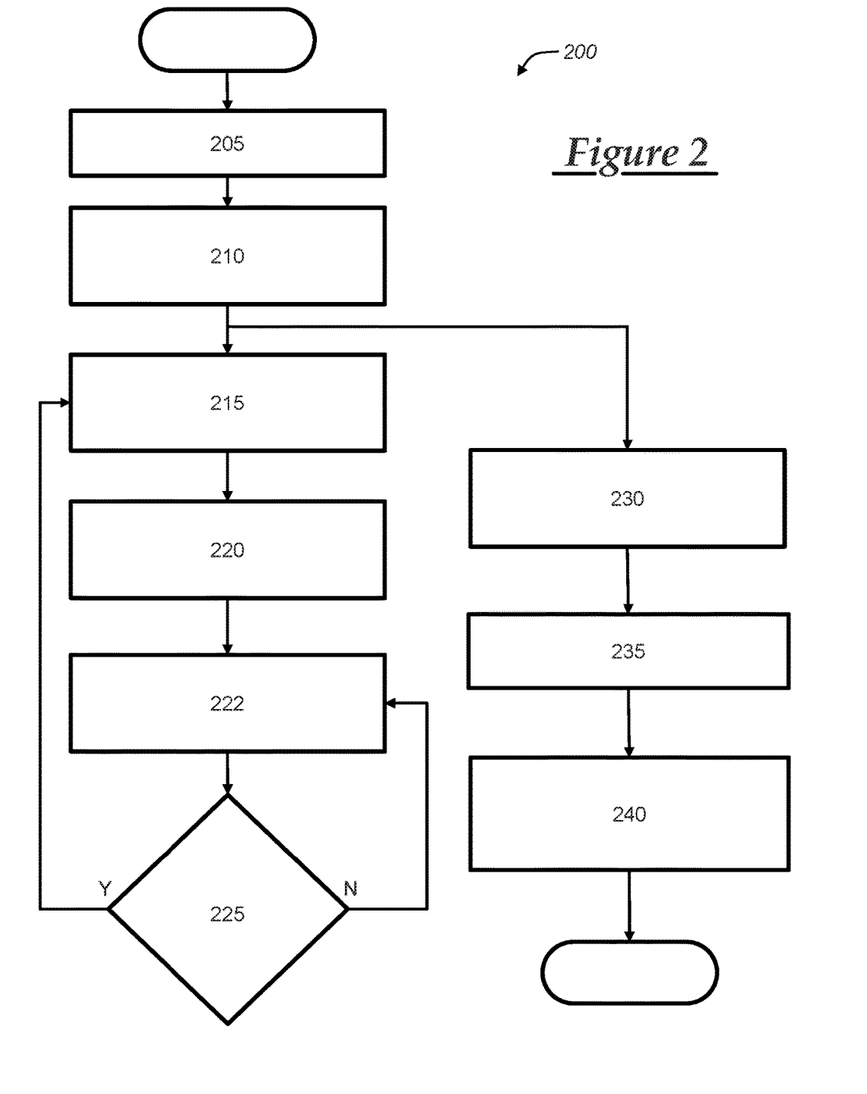
FIG. 2 is a process flow diagram of an exemplary method of providing status updates regarding vehicle commands to one or more mobile devices.

Turning now to FIG. 2, a process flow diagram illustrating various exemplary methods of providing status updates to one or more mobile devices is shown. Process 200 may begin at block 205, where a user may log in to a mobile device. For example, a user may access application 92, which is supported by the mobile device 90. The login may require the user to enter credentials such as a user identification and/or password to gain access to the application 92. In other examples, biometric information, e.g., a fingerprint, may be required to access the mobile device 90 which in turn unlocks access to the application 92. The user may send vehicle action requests and receive communications from the vehicle 12 and/or remote facility 80 by way of the application 92. While a single mobile device 90 is illustrated in FIG. 1 that is associated with vehicle 12, additional an vehicle(s) (not shown) and associated mobile devices 90 may be provided. For example, as will be described further below, in some exemplary illustrations a large number of mobile devices 90 may be in communication with respective vehicles, and the remote facility 80 may facilitate such communication. Process 200 may then proceed to block 210.

At block 210, a vehicle action request may be sent from the mobile device to a central office or remote facility. Merely as examples, a user may send a request via the mobile device 90 to initiate a remote start of the vehicle 12, to lock or unlock the door(s) of the vehicle 12, or activate an alarm of the vehicle 12. The remote facility 80 may facilitate the vehicle action request, e.g., by receiving the request from the mobile device 90, sending the command to the vehicle 12, and/or tracking a status of the vehicle 12 with respect to the request.

Proceeding to block 215, a status update frequency may be determined based upon at least one real-time characteristic. Moreover, in examples where a plurality of vehicles 12 are each in communication with a respective mobile device 90, different status update frequencies may be determined for each of the corresponding device/vehicle pairs. Real-time characteristics may include any factor affecting communication between the mobile device and the vehicle 12, or any component of communication therebetween, in real-time.

For example, a real-time characteristic may relate to the remote facility 80 or central office, such as a current communication capacity of the remote facility. Where the remote facility is less able to timely facilitate the vehicle action request and implementation thereof, e.g., due to the remote facility 80 handling a high volume of communication traffic, a status update frequency may be lower. In this manner, the remote facility may reduce overall traffic relating to status request updates received subsequently from the mobile device 90.

In another example, real-time characteristics of the mobile device may be used to determine a status update frequency. The mobile device 90 may provide information about real-time characteristics of the mobile device 90 to the remote facility 80, e.g., as part of the sending of the vehicle action request described above at block 210. Merely by way of example, real-time characteristics in this approach may include a current battery status of the mobile device 90.

Where the mobile device 90 has a low battery status, e.g., the mobile device 90 is below a predetermined threshold such as 20% of total battery life, it may be desirable to reduce a frequency of the status updates sent by the mobile device 90, thereby conserving the available battery power remaining. In another example, the real-time characteristic may be a current reception strength of the mobile device 90. For example, where the mobile device 90 is experiencing a relatively low signal strength, or a signal strength that is decreasing, e.g., as a result of being near or approaching the edge of a cellular service network, Wi-Fi network, or other communication network, it may be desirable to increase a status update frequency since there may be an expectation that the device 90 may soon lose contact with the remote facility 80. Moreover, increasing the status update frequency may help the mobile device 90 stay in contact to any extent it may be easier to remain in contact with a communication network than to reestablish contact once contact is lost.

In other exemplary approaches, characteristics of the vehicle 12 and/or the surrounding environment thereof may serve as real-time characteristics used to determine a status update frequency. For example, a current ambient temperature at the vehicle 12 may be used. In one example, where the vehicle 12 is experiencing extreme temperature conditions, e.g., very cold temperatures, a status update frequency may be relatively low or be reduced if there is an expectation of increased communication traffic between the remote facility 80 and any associated vehicles 12. Where temperatures are relatively cold in a particular region, there may be an expectation that more users will use remote start commands by way of their mobile devices. Accordingly, when an ambient temperature falls below a predetermined threshold, e.g., 40 degrees Fahrenheit, in a given region associated with vehicles 12 that receive vehicle action requests via remote facility 80, the remote facility 80 may use a lower status update frequency. Additionally, similar considerations may apply where temperatures are relatively hot, as users may desire to use a remote start event to begin cooling the vehicle interior with an air conditioning system of the vehicle 12.

Proceeding to block 222, a status of the vehicle action request may be made if the wait time dictated by the status update frequency has expired. For example, mobile device 90 may have a timer or counter which counts down according to the instructed status update frequency of block 220. Upon expiration of the wait time, the mobile device 90 may check with the back office or remote facility 80 to request a status update on the vehicle action request.

At block 225, process 200 may query whether there has been a change in the real-time characteristic, e.g., which would necessitate an alteration to the status update frequency determined at block 215. Process 200 may monitor the real-time characteristic regularly, e.g., at predetermined or adjustable intervals, or continuously. As such, when a change in the real-time characteristic occurs, e.g., ambient temperature changes such that the vehicle 12 is no longer in a cold or hot region, or communication traffic at remote facility 80 changes such that it is no longer necessary to use a reduced status update frequency, merely as examples, a corresponding change may be made to the status update frequency. Process 200 may thus proceed back to block 215 where a change has been detected. Alternatively, process 200 may proceed back to block 222 such that the mobile device 90 requests a status update if the wait time associated with the instructed status update frequency has expired. Accordingly, the mobile device 90 may continue to request status updates at an appropriate status update frequency as instructed at block 220.

At block 230, a communication may be initiated of an instruction to carry out the vehicle action request. For example, the remote facility 80 may send an instruction to the vehicle 12 to activate the vehicle remote start, lock or unlock the vehicle doors, or any other command that may be convenient. The communication from the remote facility 80 to the vehicle 12 may take any form that is convenient, such as an SMS text message, communication via cell tower 70, satellite 62, or any other manner that is convenient.

Proceeding to block 235, a confirmation of vehicle action may be received. For example, vehicle 12 may initiate the vehicle action indicated in the instruction of block 230. Upon a successful initiation of the vehicle action, such as a remote start of the vehicle or locking/unlocking of the doors, merely as examples, the vehicle 12 may initiate a communication to the remote facility 80 indicating that the vehicle action has successfully completed. Alternatively, if the vehicle 12 was unable to execute the vehicle action, e.g., the transmission of the engine was not in an appropriate position so the engine would not start, or the door locking mechanism was stuck, etc., the vehicle 12 may send an instruction to the remote facility indicating as much. Communications indicating a successful or unsuccessful completion of the vehicle action from the vehicle 12 to the remote facility 80 may take any form that is convenient, such as SMS text message, communication via cell tower 70, satellite 62, or any other manner that is convenient.

Proceeding to block 240, a notification may be sent to the mobile device upon the next request from the mobile device. For example, the remote facility 80 may send a notification indicating success or failure of the vehicle action request, consistent with the communication received from the vehicle at block 235. The notification to the mobile device 90 may take the form of a message in the application 92, or any other manner convenient such as an SMS text message, phone call, or other communication capable of being received by the mobile device 90. In some exemplary approaches, an intermediate status, such as an indication that the instruction was sent to the vehicle 12 but no confirmation of success or otherwise has yet been received by the remote facility 80, may be provided to the mobile device 90 if the remote facility 80 has not yet received a confirmation of success or lack thereof from the vehicle 12. Alternatively, such an intermediate or waiting status may be assumed by the application 92 in the absence of an indication from remote facility 80 that the vehicle action request was successfully completed or not completed. Upon receipt of a communication from the remote facility 80 indicating success or lack thereof with respect to the vehicle action request, the mobile device 90 may cease requesting status updates in connection with the vehicle action request. Moreover, the mobile device 90 may provide an indication, e.g., via the application 92, of the successful completion or failure with respect to the vehicle action request.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing status updates to a mobile device, comprising the steps of:
   (a) selecting at least one real-time characteristic based upon an expected impact of the at least one real-time characteristic on a communication capacity of the central office;
   (b) receiving a vehicle action request from the mobile device at a central office;
   (c) initiating a communication to a vehicle of an instruction to carry out a vehicle action;
   (d) determining a status update frequency based upon the at least one real-time characteristic as an indicator of real-time communication capacity of the central office; and
   (e) instructing the mobile device to request status updates on the vehicle action request to the central office at the status update frequency, wherein instructing the mobile device addresses the communication capacity at the central office by preventing the mobile device from requesting the status update more quickly than the instructed status update frequency.

2. The method of claim 1, further comprising the step of altering the status update frequency in response to a change in the at least one real-time communication characteristic.

3. The method of claim 1, further comprising decreasing the status update frequency when a current ambient temperature is below a predetermined threshold temperature.

4. The method of claim 1, further comprising decreasing the status update frequency in response to a decrease in a current communication capacity of the central office.

5. The method of claim 1, further comprising providing an application supported by the mobile device, wherein the status updates are communicated to the mobile device via the application.

6. The method of claim 1, further comprising determining whether the vehicle action was successfully carried out by the vehicle; and
   sending a notification to the mobile device indicating the success or failure.

7. The method of claim 1, wherein the vehicle action requests include one of a remote start request, an unlock request, a lock request, and an alarm request.

8. The method of claim 1, further comprising:
   (f) receiving an additional vehicle action request from at least a second mobile device at the central office;
   (g) determining a different status update frequency for the second mobile device based upon a real-time characteristic associated with the second mobile device; and
   (h) instructing the second mobile device to request status updates on the additional vehicle action request at the assigned different status update frequency.

9. The method of claim 1, further comprising indirectly representing the communication capacity in the determination of the status update frequency using the real-time characteristic.

10. A method of providing status updates to a plurality of mobile devices, comprising the steps of:
    (a) selecting at least one real-time characteristic based upon an expected impact of the at least one real-time characteristic on an ability of a respective mobile device to maintain communication with a central office;
    (b) receiving vehicle action requests from the plurality of mobile devices at a central office;
    (c) determining status update frequencies for each of the plurality of mobile devices based upon at least one real-time characteristic associated with each mobile device as an indicator of real-time ability of the mobile device to maintain communication with a central office, respectively; and
    (d) instructing each of the mobile devices to request status updates on the vehicle action request to the central office at their assigned status update frequency, wherein instructing the mobile devices addresses the real-time ability of the mobile devices to maintain communication with the central office by instructing the mobile devices to request the status update more frequently.

11. The method of claim 10, wherein the real-time characteristic is a characteristic of the central office or one of the mobile devices.

12. The method of claim 10, further comprising receiving the at least one real-time characteristic from at least one of the mobile devices.

13. The method of claim 12, wherein the at least one real-time characteristic is a characteristic of the at least one of the mobile devices.

14. The method of claim 13, wherein the characteristic of the at least one of the mobile devices is one of a current battery status of the at least one of the mobile devices and a current reception strength of the at least one of the mobile devices.

15. The method of claim 10, wherein the at least one real-time characteristic is any one or more of the following characteristics:
    a current communication capacity of the central office;
    a current ambient temperature;
    a current battery status of at least one of the mobile devices; and
    a current reception strength of the at least one of the mobile devices.

16. The method of claim 10, further comprising decreasing the status update frequency of at least one of the mobile devices in response to a low battery status of the at least one of the mobile devices.

17. The method of claim 10, wherein the at least one real-time characteristic is a reception strength of the mobile device, and wherein the step of instructing the mobile devices to request the status update more frequently is in response to a low signal reception strength of the mobile device.

18. The method of claim 10, wherein the vehicle action requests each include a control of a vehicle function or a request for information from the vehicle.

19. The method of claim 10, further comprising establishing different status update frequencies for the plurality of mobile devices.

20. A system for providing status updates to a mobile device, comprising:

a server configured to receive a vehicle action request from the mobile device at a central office;

wherein the server is configured to select at least one real-time characteristic based upon an expected impact of the at least one real-time characteristic on a communication capacity of the central office, determine a status update frequency based upon the at least one real-time characteristic as an indicator of real-time communication capacity of the central office, and instruct the mobile device to request status updates on the vehicle action request to the central office at the status update frequency, thereby addressing the communication capacity at the central office by preventing the mobile device from requesting the status update more quickly than the instructed status update frequency.

* * * * *